US011092758B2

(12) United States Patent
Iizumi et al.

(10) Patent No.: US 11,092,758 B2
(45) Date of Patent: Aug. 17, 2021

(54) MECHANICAL TRANSFER FERRULE ASSEMBLY AND METHOD OF ASSEMBLY

(71) Applicant: SENKO ADVANCED COMPONENTS, INC, Marlborough, MA (US)

(72) Inventors: Kenji Iizumi, Tokyo (JP); Kazuyoshi Takano, Tokyo (JP)

(73) Assignee: Senko Advanced Components, Inc., Marlborough, MA (US)

( * ) Notice: Subject to any disclaimer, the term of this patent is extended or adjusted under 35 U.S.C. 154(b) by 0 days.

(21) Appl. No.: 16/674,830

(22) Filed: Nov. 5, 2019

(65) Prior Publication Data

US 2020/0142133 A1    May 7, 2020

Related U.S. Application Data

(60) Provisional application No. 62/756,845, filed on Nov. 7, 2018.

(51) Int. Cl.
*G02B 6/36* (2006.01)
*G02B 6/38* (2006.01)

(52) U.S. Cl.
CPC .......... *G02B 6/387* (2013.01); *G02B 6/3652* (2013.01); *G02B 6/3839* (2013.01); *G02B 6/3863* (2013.01); *G02B 6/3882* (2013.01); *G02B 6/3885* (2013.01)

(58) Field of Classification Search
CPC ............................ G02B 6/3652; G02B 6/3885
See application file for complete search history.

(56) References Cited

U.S. PATENT DOCUMENTS

| 5,134,673 | A | * | 7/1992 | Stephenson | .......... | G02B 6/3807 |
| | | | | | | 385/136 |
| 8,052,334 | B2 | | 11/2011 | Childers et al. | | |
| 9,465,170 | B1 | | 10/2016 | Childers et al. | | |
| 10,067,297 | B2 | | 9/2018 | Childers | | |
| 10,162,122 | B2 | | 12/2018 | Childers et al. | | |
| 2003/0016918 | A1 | * | 1/2003 | Grabbe | ................ | G02B 6/3865 |
| | | | | | | 385/78 |
| 2003/0113090 | A1 | * | 6/2003 | Lee | ...................... | G02B 6/3652 |
| | | | | | | 385/137 |

(Continued)

FOREIGN PATENT DOCUMENTS

| EP | 0961142 A1 | * | 12/1999 | .......... | G02B 6/3885 |
| WO | WO-9715850 A1 | * | 5/1997 | .......... | C03B 11/082 |
| WO | WO-2012111650 A1 | * | 8/2012 | .......... | G02B 6/3881 |

*Primary Examiner* — Charlie Y Peng
(74) *Attorney, Agent, or Firm* — Stinson LLP

(57) ABSTRACT

A mechanical transfer ferrule is formed from a top housing and a bottom housing secured together with a plural of clips, catches and snap from a distal end of the housing portions to a proximal end of the housing portions. A plural of upper grooves formed in the upper housing and a plural of lower grooves formed in the lower housing accept a plural of optical fiber provided by a ribbon cable at a distal end of the mechanical transfer ferrule. At a proximal end of the upper housing is a pressure surface received in a pressure surface cut-out in the lower housing, where the pressure surface secures and orients the optical fiber within the channels formed by the upper and lower grooves to aid in repeated mating with a corresponding mechanical transfer ferrule and polishing the end face of the plural of optical fibers.

11 Claims, 8 Drawing Sheets

(56) References Cited

U.S. PATENT DOCUMENTS

| | | | | |
|---|---|---|---|---|
| 2012/0014649 A1* | 1/2012 | Duis | ............... | G02B 6/3839 |
| | | | | 385/65 |
| 2012/0257860 A1* | 10/2012 | Li | ............... | G02B 6/3885 |
| | | | | 385/83 |
| 2014/0086538 A1* | 3/2014 | Kuo | ............... | G02B 6/3885 |
| | | | | 385/89 |

* cited by examiner

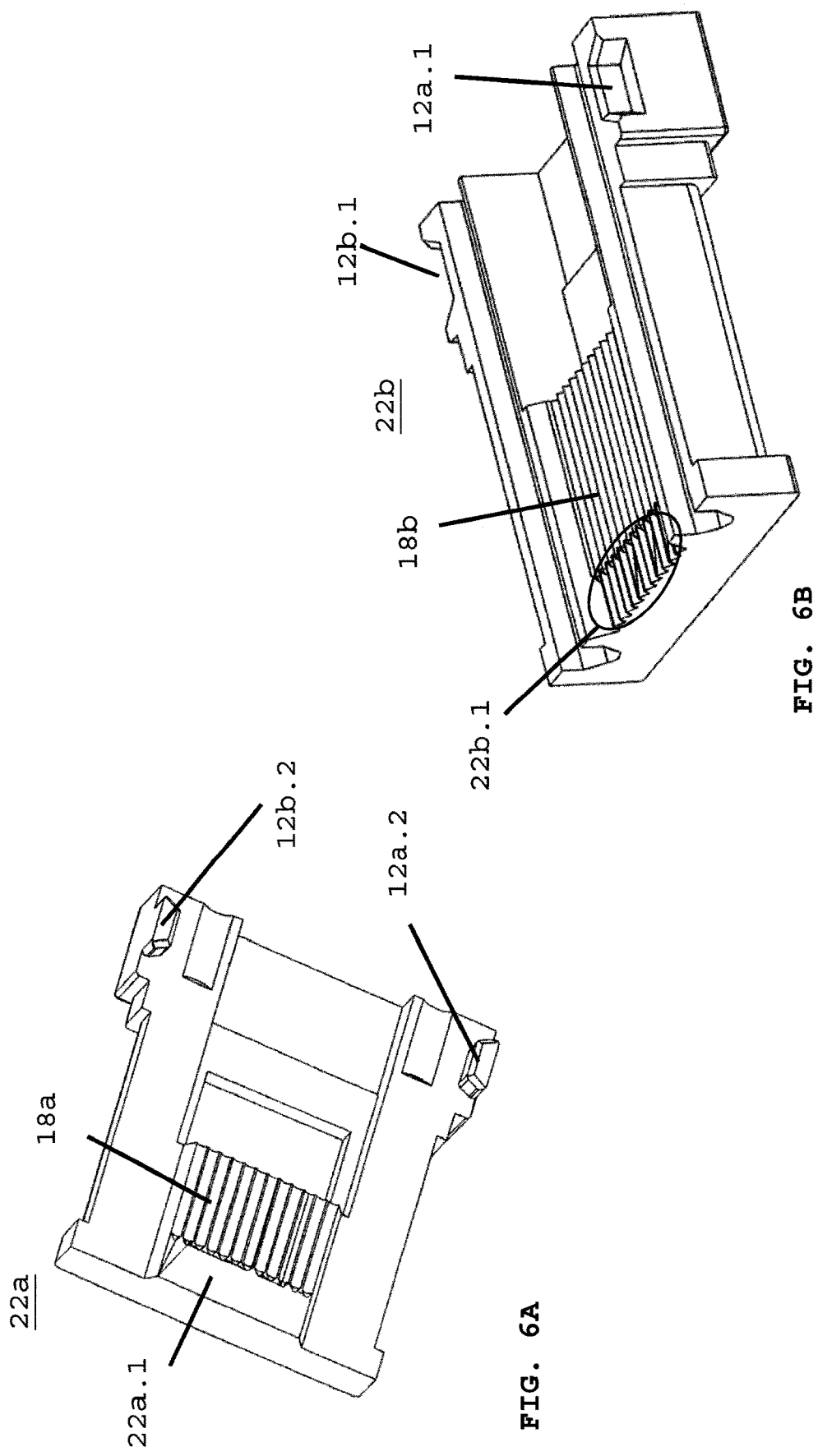

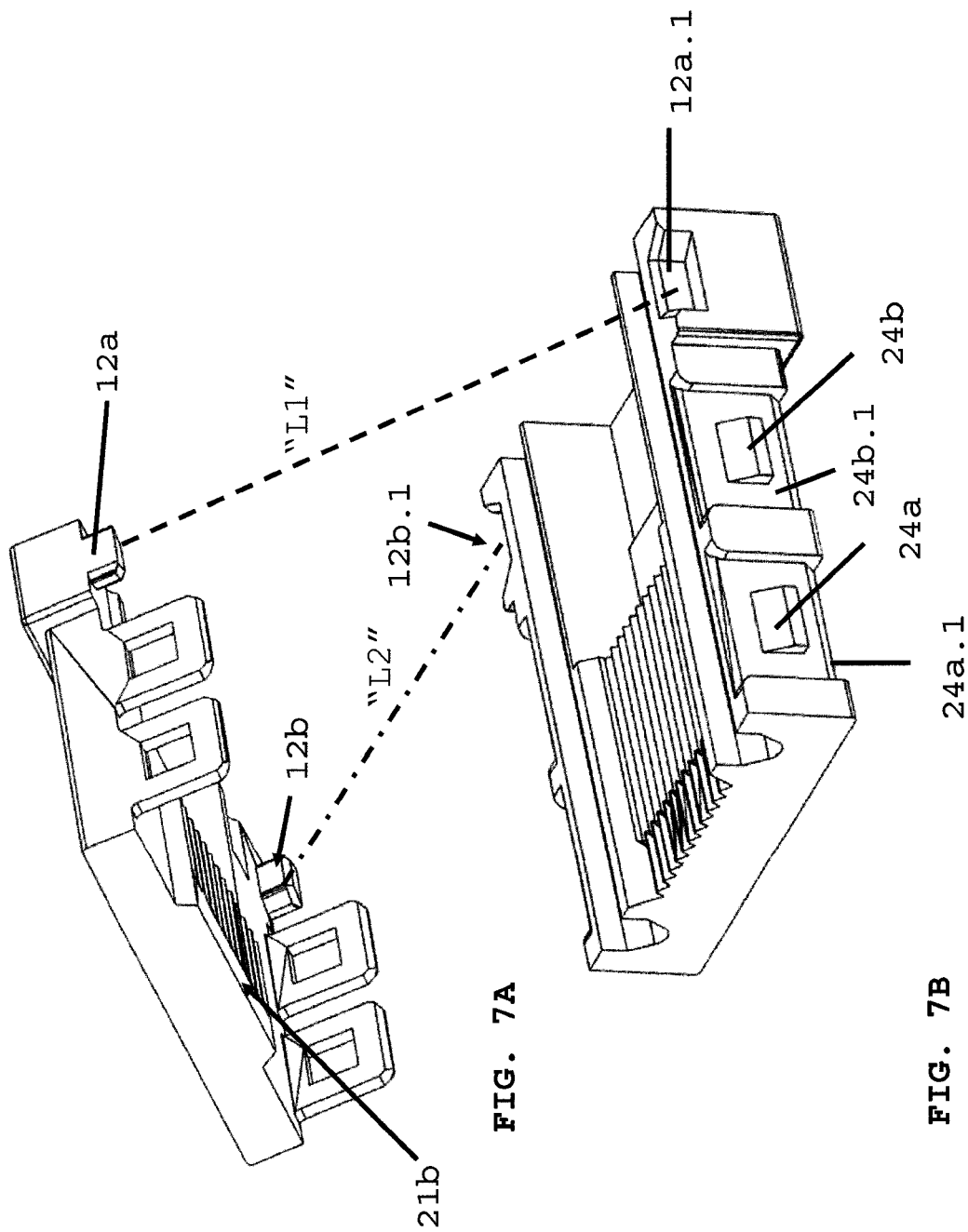

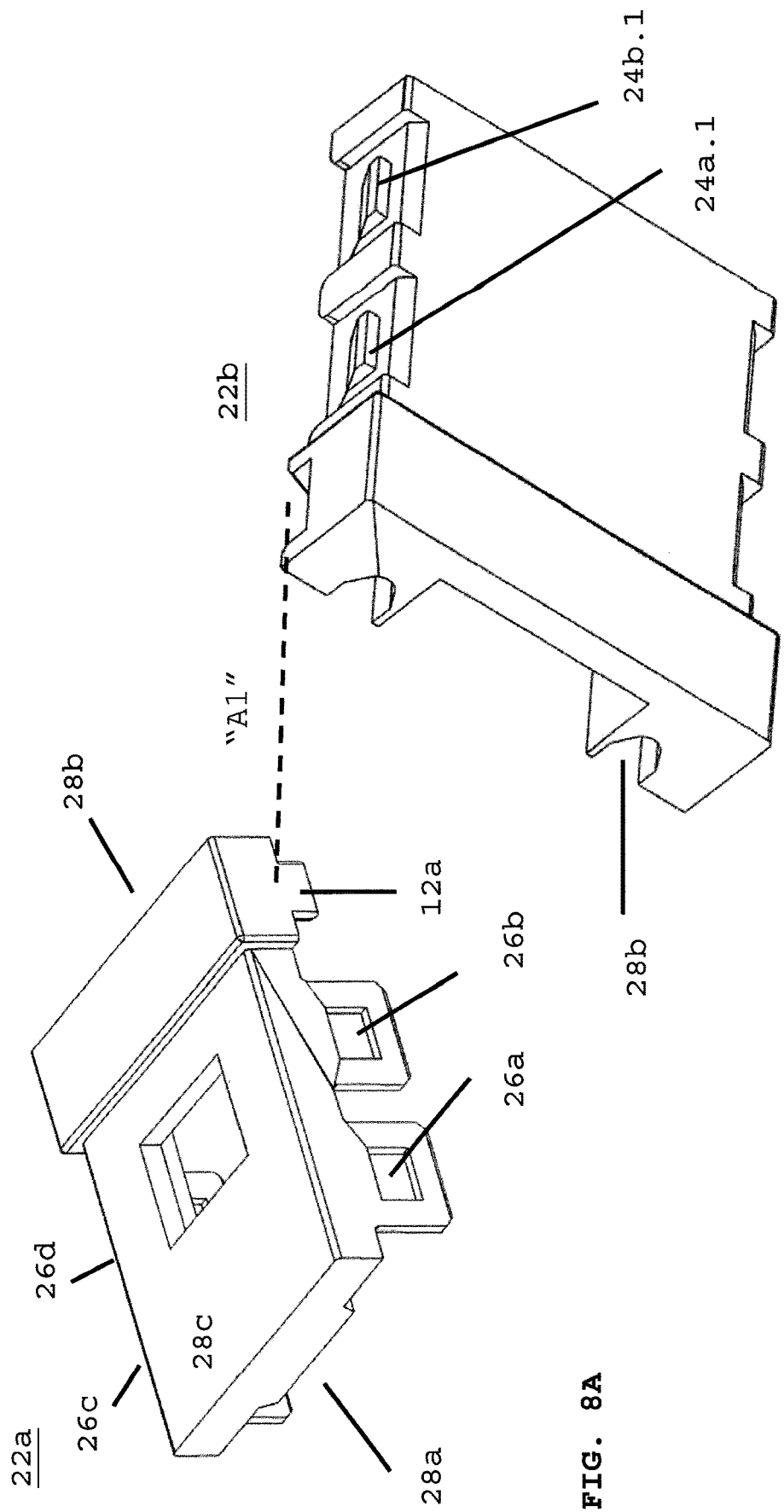

MECHANICAL TRANSFER FERRULE ASSEMBLY AND METHOD OF ASSEMBLY

RELATED APPLICATIONS

This application claims priority to U.S. Patent Application 62/756,845 filed on Nov. 7, 2018, which is included by reference.

FIELD OF INVENTION

This invention present disclosure relates generally to mechanical transfer ferrules and more specifically to forming or making a mechanical transfer ferrule in the field or in the manufacturing plant.

BACKGROUND

The prevalence of the Internet has led to unprecedented growth in communication networks. Consumer demand for service and increased competition has caused network providers to continuously find ways to improve quality of service while reducing cost.

Certain solutions have included deployment of high-density interconnect panels. High-density interconnect panels may be designed to consolidate the increasing volume of interconnections necessary to support the fast-growing networks into a compacted form factor, thereby increasing quality of service and decreasing costs such as floor space and support overhead.

The use of optical connectors and ferrules has exploded as the need for faster data transfer has increased. Due to the nature of fiber optics (i.e., that they are optical in nature), forming or making a mechanical transfer ferrule requires precision and accuracy as the optical fiber counts within a standard ferrule body is increasing. Also, the end face of the optical fiber must be polished to ensure maximum light transfer to and from an opposing mechanical transfer ferrule. In fiber optic connectors, embedded optical fibers transmit light between opposing fibers and the transmitted light has the optical signal information.

SUMMARY OF THE INVENTION

According to one aspect of the invention, a bottom housing has a plural of channels or grooves that accept an optical fiber from a ribbon cable that is secured at a backend or distal end of the formed mechanical transfer ferrule. The cable is secured between a top housing and the bottom housing. The top housing and bottom housing are secured together using a snap or protrusion accepted in a recess and a side clip that extends substantially along a middle portion of the ferrule housing. The grooves are separated into upper grooves and lower grooves. The lower grooves are formed as part of the lower housing. At a proximal end of the lower grooves is a step or cut-out formed within the lower grooves to accept a pressure plate that is formed proximal of the upper grooves formed in the upper housing. The pressure plate secures a proximal end of the optical fiber array from the ribbon cable within the plural of grooves. The pressure plate prevents movement of the optical fiber thus its end face reduces insertion loss between opposing mechanical transfer ferrules when mated. Opposing mechanical transfer ferrules are mated when a female mechanical transfer ferrule has a pair of opposing guide pin channels or openings that accept a corresponding guide pin from a male mechanical transfer ferrule, as depicted in the prior art such as U.S. Pat. No. 9,798,090 "REDUCED-PROFILE DATA TRANSMISSION ELEMENT CONNECTORS, ADAPTERS, AND CONNECTION ASSEMBLIES THEREOF, Takano et al., granted on Oct. 24, 2017.

According to another aspect of the invention, the upper housing and lower housing have the same lower grooves and upper grooves with the pressure plate formed as part of the upper housing. In the second embodiment, the upper housing and lower housing are secured with the snap and recess and instead of the opposing side clips a set of opposing catches and catch openings further the upper housing and lower housing.

BRIEF DESCRIPTION OF THE DRAWINGS

FIG. 6A is a perspective view of FIG. 1 depicting the underside of the upper housing;

FIG. 6B is a perspective view of FIG. 1 depicting the lower housing;

FIG. 7A is a perspective view of FIG. 3 depicting the upper housing further illustrating the inside of the upper housing;

FIG. 7B is a perspective view of FIG. 3 depicting the lower housing further illustrating the inside of the lower housing;

FIG. 8A is a perspective view of FIG. 3 upper housing, and

FIG. 8B is a perspective view of FIG. 3 lower housing.

DETAILED DESCRIPTION

This disclosure is not limited to the particular systems, devices and methods described, as these may vary. The terminology used in the description is for the purpose of describing the particular versions or embodiments only, and is not intended to limit the scope.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

The following terms shall have, for the purposes of this application, the respective meanings set forth below.

A "connector," as used herein, refers to a device and/or components thereof that connects a first module or cable to a second module or cable. The connector may be configured for fiber optic transmission or electrical signal transmission. The connector may be of any suitable type now known or later developed, such as, for example, a ferrule connector (FC), a fiber distributed data interface (FDDI) connector, an Lucent Connector (LC) connector, a mechanical transfer (MT) connector, a square connector (SC) connector, an SC duplex connector, or a straight tip (ST) connector. The connector may generally be defined by a connector housing body. In some embodiments, the housing body may incorporate any or all of the components described herein.

A "fiber optic cable" or an "optical cable" refers to a cable containing one or more optical fibers for conducting optical signals in beams of light. The optical fibers can be constructed from any suitable transparent material, including glass, fiberglass, and plastic. The cable can include a jacket or sheathing material surrounding the optical fibers. In addition, the cable can be connected to a connector on one end or on both ends of the cable.

A ferrule secures one or more optical fibers within a body or housing formed as one-piece or two-piece. The housing secures a fiber optic cable with one or more optical fiber therein at a distal end or first end of the ferrule, and the optical fiber are spread out or spaced apart at a proximal end or second end of the ferrule housing. The ferrule end face or optical fiber end face is polished and/or angled (at 8 degrees for a APC ferrule) to ensure maximum light signal transfer from a first ferrule to a second and opposing ferrule held in an adapter, and mated by guide pins protruding from a first ferrule or the male mechanical transfer ferrule. And the mating occurs when the guide pins are accepted within channels formed in the female mechanical transfer ferrule.

Figure 1:
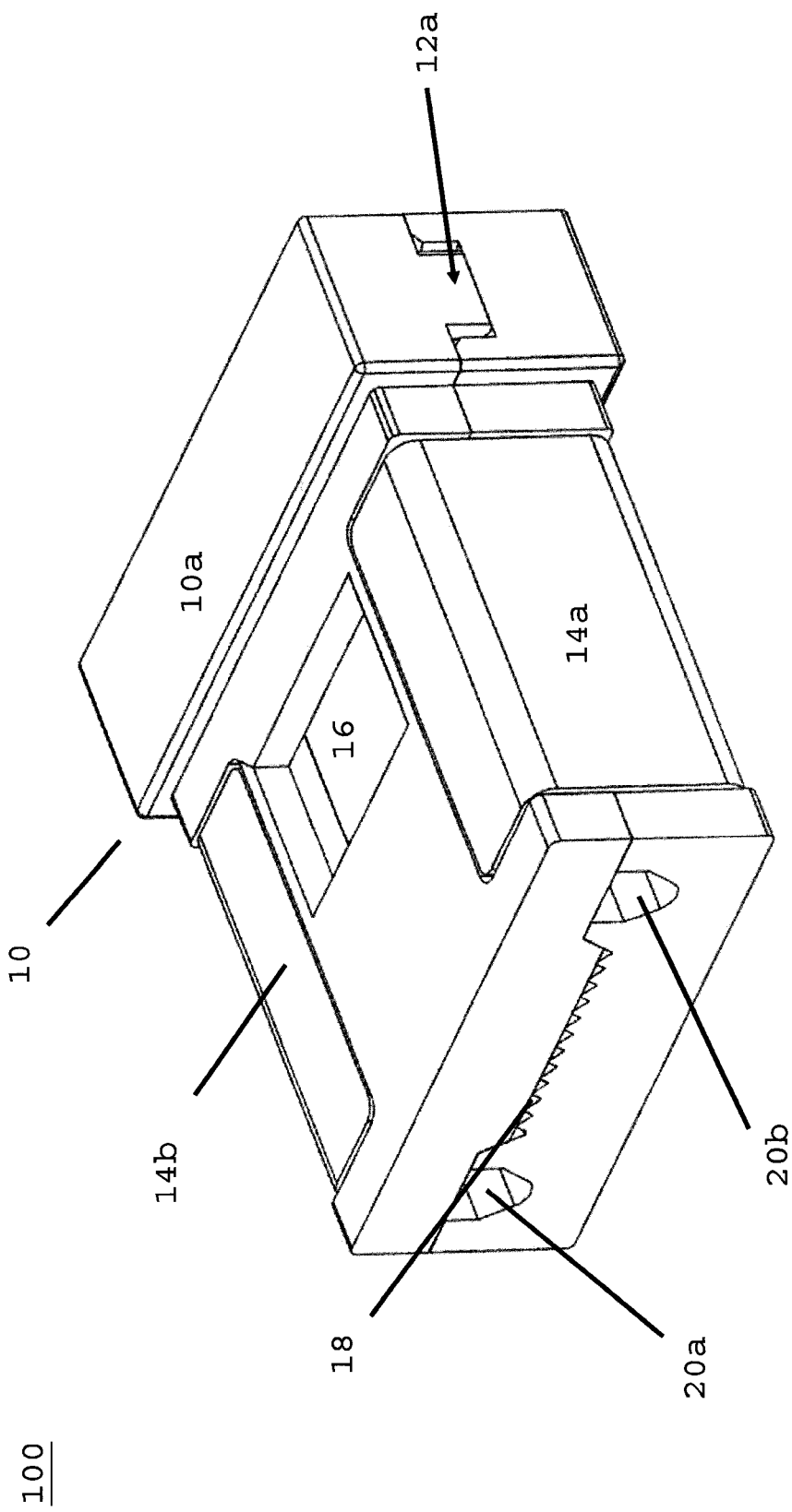
FIG. 1 is a perspective view of an assembled mechanical transfer ferrule according to a first embodiment of the invention.

FIG. 1 depicts an assembled mechanical transfer ferrule (100) according to a first embodiment of the present invention. Top housing (22a) and bottom housing (22b) (refer to FIG. 5) are secured using a pair of opposing side clip (14a, 14b) and a snap (12a) (opposing snap (12b) is not shown), snap (12a) is secured within lock recess (12a.1) (refer to FIG. 5). Securing the top housing and the bottom housing forms a ferrule body through which a plural of optical fibers are secured. A fiber optic cable typically a ribbon cable (as is known in the art) is secured by shoulder (10a) formed from the upper housing and lower housing at a distal end of the mechanical transfer ferrule. Window (16) allows for visual inspection that the optical fibers within the fiber optic cable are positioned within upper grooves (18a) (refer to FIG. 6A) and lower grooves (18b) (refer to FIG. 6B). Also, window (16) allows for placement of an adhesive or epoxy to further secure the upper and lower housing, and optical fibers within channel or groove (18) formed from by the upper and lower grooves. The upper housing and lower housing form a pair of opposing guide pin channels (20a, 20b) that accept a pair of corresponding, opposing guide pins from a male mechanical transfer ferrule mated to mechanical transfer ferrule (100) to form a signal path.

Figure 2:
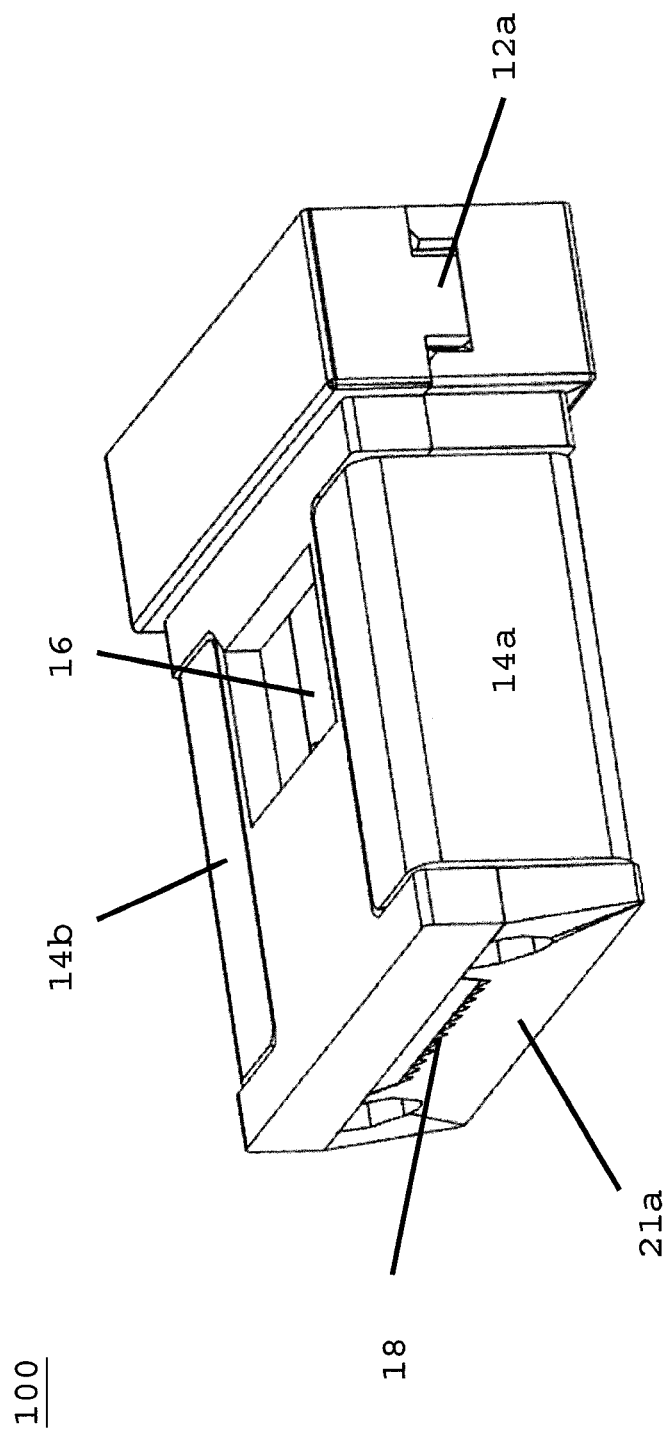
FIG. 2 is another perspective view of FIG. 1.

FIG. 2 depicts another view of the assembly of FIG. 1 mechanical transfer ferrule (100). Side clips (14a, 14b) are secured to middle portion (28c) (refer to FIG. 8A) of ferrule housing (10). Ferrule housing (10) (refer to FIG. 1) is formed by upper housing (22a) and bottom housing (22b) (refer to FIG. 5). FIG. 2 depicts angled front portion (21a) that improves mating to an opposing mechanical transfer ferrule by providing an orienting surface at the angled front portion, and reduces polishing as the fiber when the angled surface acts as a guide for the depth of polishing.

Figure 3:
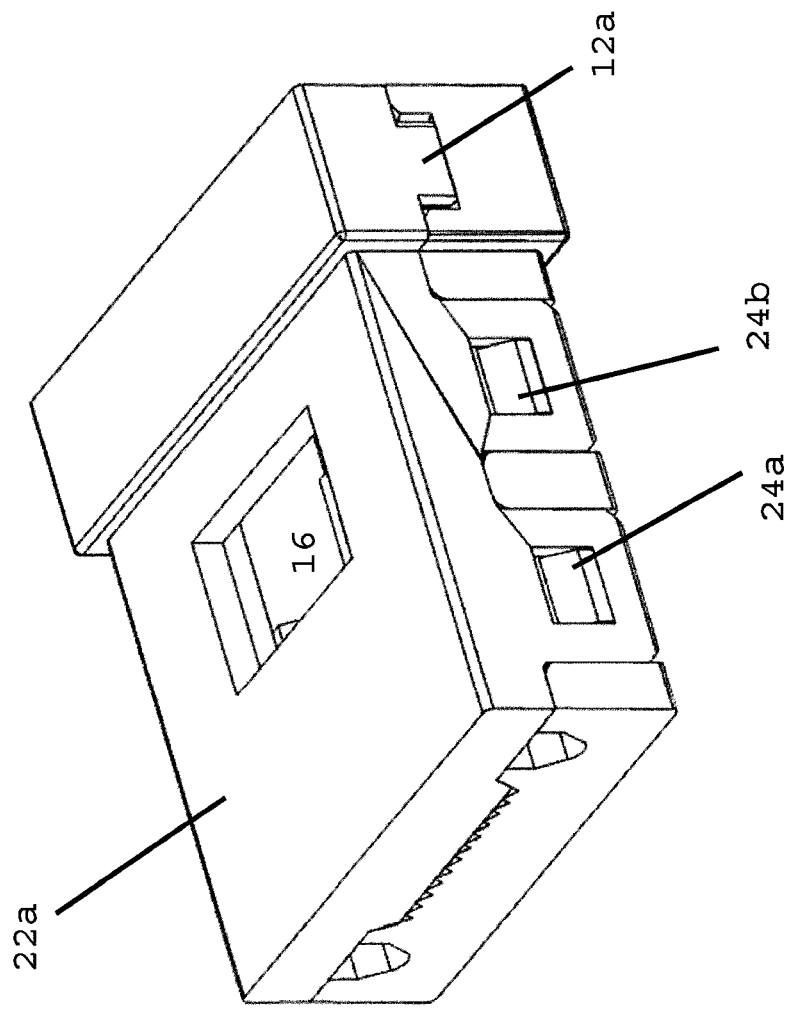
FIG. 3 is a perspective view of an assembled mechanical transfer ferrule according to a second embodiment of the invention.

FIG. 3 depicts the second embodiment of the present invention. Snap (12a) secures at the distal end top housing (22a) to the bottom housing to form the ferrule housing. Instead of the side clips about the middle portion, a pair of catch (24a, 24b) are secured within a corresponding catch opening (26a, 26b) (refer to FIG. 8A). An opposing set of catch (24c, 24d) (not shown) are secured within catch opening (26c, 26d) (refer to FIG. 8A). The opposing sets of catch and catch openings help form the ferrule housing. FIG. 7A has a flat front portion and flat pressure surface (21b).

Figure 4:
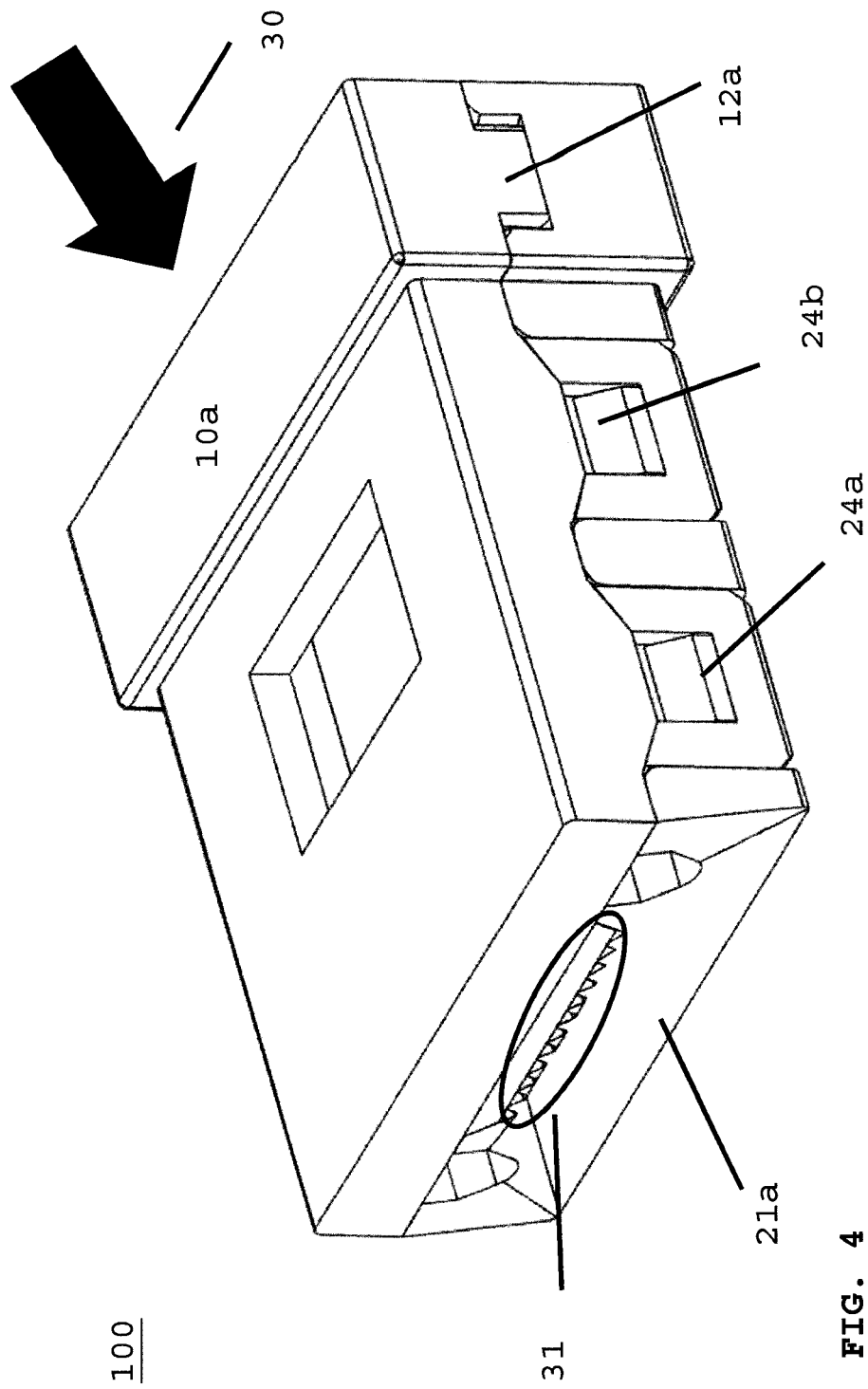
FIG. 4 is another perspective view of FIG. 3.

FIG. 4 depicts angled front portion (21a) replacing flat front portion of FIG. 7A. The plural of optical fibers terminate at end face (31) of the mechanical transfer ferrule. The plural of optical fibers are provided by ribbon cable (30) at a distal end of ferrule (100). After assembly, the end face is polished.

Figure 5:
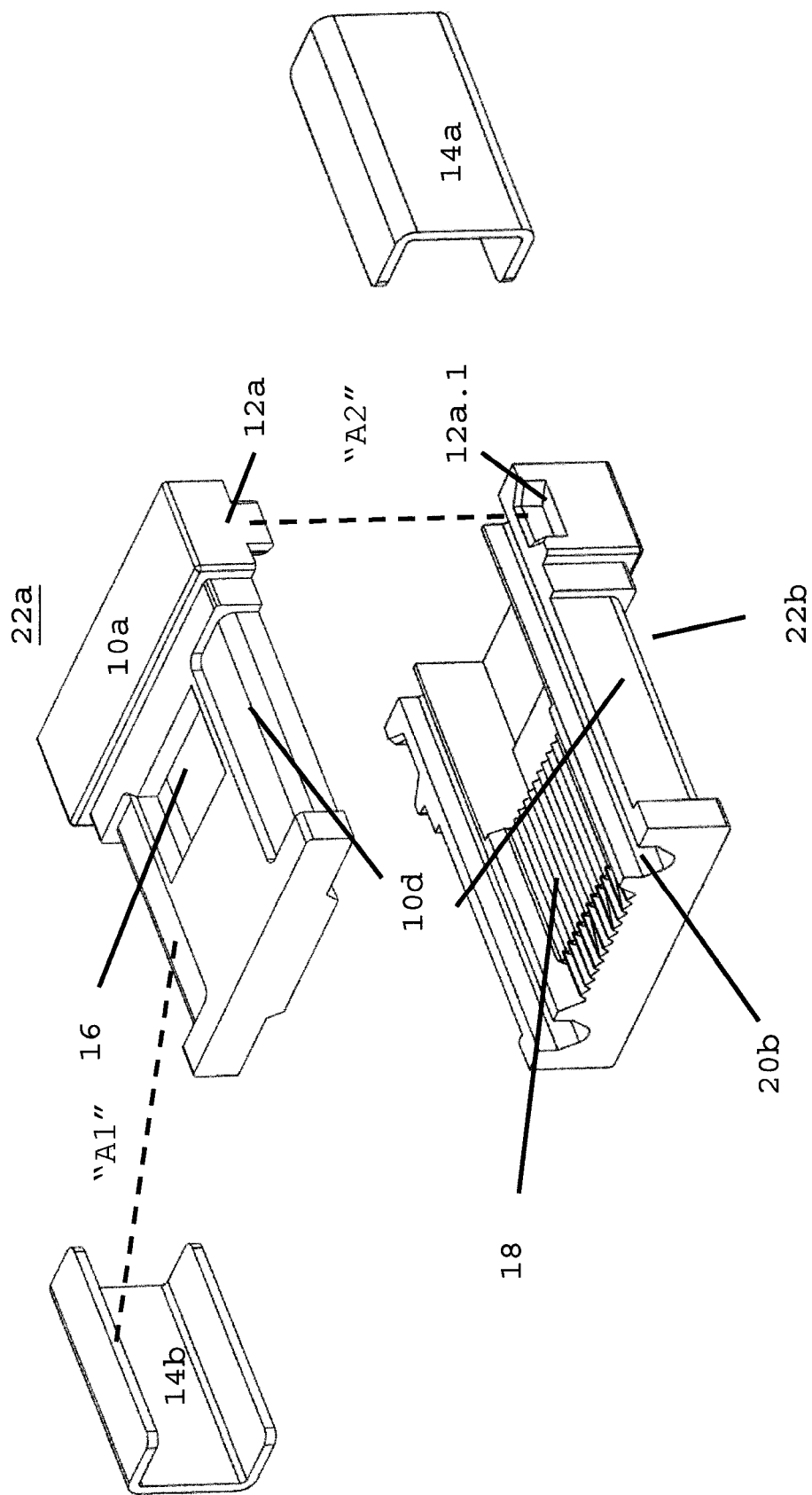
FIG. 5 is an exploded view of FIG. 1.

FIG. 5 depicts an exploded view of FIG. 1 mechanical transfer ferrule (100). Top housing (22a) has shoulder (10a) for securing a ribbon cable with a plural of optical fibers. The top housing has opposing side clip receiving surfaces (10d), and window (16) that a user can inject epoxy to help secure optical fibers within grooves or channels (18). Side clip (14b) is accepted onto side clip receiving surfaces (10d), along line "A1" about a middle portion of the ferrule housing, when the top housing and bottom housing are secured together to form the ferrule housing. Snap (12a) is accepted into lock recess (12a.1) along line "A2". Snap (12a) has protrusion (12a.2, 12b.2) with cut-face (FIG. 6A) that locks into recess of lock recess (12a.1, 12b.1) (refer to FIG. 6B). Top housing (22a) has pressure surface (22a.1) (refer to FIG. 6A) that is received in pressure surface cut-out (22b.1) (refer to FIG. 6B) of lower housing (22b). The pressure surface has a plural of half-channel openings that are in-line with plural of upper grooves (18a) that secure the optical fibers from the fiber optic cable provided at a distal end of the mechanical transfer ferrule. Upper grooves (18a) (refer to FIG. 6A) correspond with lower grooves (18b) (refer to FIG. 6B) to encapsulate or surround each individual optical fiber. The pressure surface helps ensure the plural of optical fiber at the proximal end of the mechanical transfer ferrule are secured, aligned and oriented during use or polishing. The pressure plate applies a force to secure the optical fiber. The force is provided to the pressure plate through side clips (14a, 14b), snap (12a, 12b) or catch (24a, 24b) and catch opening (26a, 26b, 26c, 26d) (refer to FIGS. 7A and 7B).

Referring to FIG. 7A and FIG. 7B, FIG. 7A depicts a second embodiment of top housing (22a). Snap (12a) is accepted into snap lock recess (12a.1) (refer to FIG. 7B) to secure distal end (28b) (refer to FIG. 8A and FIG. 8B) of upper housing (22a) and lower housing (22b) to help form the mechanical transfer ferrule. In this embodiment, a plural of catch opening (26a-26b) (refer to FIG. 8A) accept corresponding catch (24a-24d) to secure middle portion (28c) and proximal end (28a) (refer to FIG. 8A) of the mechanical transfer ferrule together. In operation, catch (24a) is secured within catch opening (26a), and catch locking surface (24a.1) prevents the catch opening without a deliberate lifting of the catch opening over the catch. Catch opening (26b-26d) operate the same with corresponding catch (24b-24d). Referring to FIG. 6A, pressure surface (22a.1) is not flat and accepted into pressure surface cut-out (22b.1) at a proximal end of lower housing (22b) (refer to FIG. 7B). Pressure surface (22a.1) has a plural of grooves that are in-line with upper grooves (18a) and lower grooves (18b) (refer to FIG. 7B). The operation of the upper and lower grooves described above are the same for the second embodiment of the mechanical transfer ferrule of FIGS. 7A-8B. Snap (12a) is accepted into recess (12.1a) along line "L1", and snap (12b) along line "L2" into recess (12b.1).

Referring to FIG. 8A upper housing (22a) has a window to accept the epoxy to secure the plural of optical fibers with a channel formed by the upper grooves and lower grooves. FIG. 8B. depicts lower housing (22b) with catch locking surface (24a.1, 24b.1) that accepts a corresponding catch opening (26a, 26b) to secure upper housing (22a) with lower housing (22b) (refer to FIG. 8B) to form the mechanical transfer ferrule. Snap (12a) is accepted into the recess along line "A1".

In the above detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (for example, bodies of the appended claims) are generally intended as "open" terms (for example, the term "including" should be interpreted as "including but not limited to," the term "having" should be interpreted as "having at least," the term "includes" should be interpreted as "includes but is not limited to," et cetera). While various compositions, methods, and devices are described in terms of "comprising" various components or steps (interpreted as meaning "including, but not limited to"), the compositions, methods, and devices can also "consist essentially of" or "consist of" the various components and steps, and such terminology should be interpreted as defining essentially closed-member groups. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (for example, "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (for example, the bare recitation of "two recitations," without other modifiers, means at least two recitations, or two or more recitations).

The invention claimed is:

1. A mechanical transfer ferrule, comprising:
a ferrule body formed from a top housing and a lower housing, the ferrule body having a longitudinal axis and a proximal end portion and a distal end portion spaced apart along the longitudinal axis;
the top housing having an upper portion and a lower portion, the lower portion of the top housing defining a plurality of upper grooves and the lower portion of the top housing defining a pressure surface formed at the proximal end portion of the ferrule body, at least part of the pressure surface protruding downward in relation to the upper grooves;
the lower housing having an upper portion and a lower portion, the upper portion of the lower housing having a plurality of lower grooves and a pressure surface cut-out formed to accept the pressure surface;
the upper grooves and lower grooves together forming a plurality of channels therebetween, the channels configured to accept a plurality of optical fibers provided by a ribbon cable secured at a distal end of the mechanical transfer ferrule; and
wherein the pressure surface is configured to secure the plurality of optical fibers from movement within the plurality of channels during mating with an opposing mechanical transfer ferrule.

2. The mechanical transfer ferrule of claim 1, wherein the top housing is secured to the lower housing with at least one snap and at least one snap recess.

3. The mechanical transfer ferrule of claim 1, wherein the top housing is secured to the lower housing with at least one side clip received in at least one side clip receiving surface.

4. The mechanical transfer ferrule of claim 1, wherein the pressure surface is angled and the pressure surface cut-out has an opposite angle at a proximal end of the lower housing.

5. The mechanical transfer ferrule of claim 1, wherein the lower housing includes a pressure surface receiving surface defining part of the pressure surface cutout, wherein the top housing pressure surface is parallel to the lower housing pressure surface receiving surface.

6. The mechanical transfer ferrule of claim 5, wherein the pressure surface receiving surface is a recessed surface.

7. The mechanical transfer ferrule of claim 4, wherein the pressure surface further comprises a plurality of grooves in-line with the upper grooves.

8. The mechanical transfer ferrule of claim 1, wherein the upper housing and lower housing form a pair of opposing guide pin channels to accept and mate with a pair of guide pins from a male mechanical transfer ferrule.

9. The mechanical transfer ferrule of claim 1, wherein the upper housing further comprises a window that accepts an epoxy used to secure the plurality of optical fiber within each corresponding channel.

10. A method of assembling a mechanical transfer ferrule comprising:
providing an unassembled mechanical transfer ferrule comprising: a ferrule body formed from a top housing and a lower housing, the top housing having plurality of upper grooves and a pressure surface formed at a proximal end of the top housing, the lower housing having a plurality of lower grooves and a pressure surface cut-out formed to accept the pressure surface, the upper grooves and the lower grooves configured to form a plurality of channels, the channels configured to accept a plurality of optical fibers provided by a ribbon cable secured at a distal end of the mechanical transfer ferrule; wherein the pressure plate secures the plurality of optical fiber from movement within a corresponding channel during mating with an opposing mechanical transfer ferrule;
providing the ribbon cable with the plurality of optical fibers at the distal end of the mechanical transfer ferrule;

inserting each optical fiber within one of the channels formed by the upper grooves and lower grooves of the mechanical transfer ferrule;

forming the mechanical transfer ferrule by securing a snap and snap recess and a side clip and side clip receiving surface between the upper housing and lower housing; and polishing an end face of the mechanical transfer ferrule.

11. A mechanical transfer ferrule, comprising:

a ferrule body formed from a top housing and a lower housing;

the top housing having plurality of upper grooves and a pressure surface formed at a proximal end of the top housing;

the lower housing having a plurality of lower grooves and a pressure surface cut-out formed to accept the pressure surface, the upper grooves and the lower grooves configured to form a plurality of channels, the channels configured to accept a plurality of optical fibers provided by a ribbon cable secured at a distal end of the mechanical transfer ferrule;

wherein the pressure plate secures the plurality of optical fiber from movement within a corresponding channel during mating with an opposing mechanical transfer ferrule;

the top housing is configured to be secured to the lower housing with at least one snap and at least one snap recess; and the top housing is configured to be secured to the lower housing with at least one side clip received in at least one side clip receiving surface.

\* \* \* \* \*